United States Patent [19]
Walsh

[11] Patent Number: 5,406,696
[45] Date of Patent: Apr. 18, 1995

[54] MACHINE FOR ASSEMBLING A MAGNETIC LATCH ASSEMBLY

[75] Inventor: Michael S. Walsh, Fort Wayne, Ind.

[73] Assignee: Xolox Corporation, Fort Wayne, Ind.

[21] Appl. No.: 157,995

[22] Filed: Nov. 26, 1993

[51] Int. Cl.$^6$ ............................................. B23P 21/00
[52] U.S. Cl. ........................................ 29/705; 29/711; 29/718; 29/720; 29/783; 29/790
[58] Field of Search ................. 29/430, 525, 705, 709, 29/711, 714, 718, 720, 771, 783, 785, 787, 790, 791, 792, 795, 809, DIG. 95

[56] References Cited
U.S. PATENT DOCUMENTS

| | | | |
|---|---|---|---|
| 3,798,736 | 3/1974 | Gibbons et al. | 29/783 |
| 4,630,358 | 12/1986 | Taylor et al. | 29/792 |
| 5,036,569 | 8/1991 | Linnecke | 29/783 |

*Primary Examiner*—Mark Rosenbaum
*Assistant Examiner*—David P. Bryant
*Attorney, Agent, or Firm*—Barnes & Thornburg

[57] ABSTRACT

A multi-station machine assembles magnetic latch assemblies having components which include a post, a magnet, and a surrounding casing. The magnetic latch assemblies are used for "parking" a read/write head of a memory storage device over a data-free landing zone during off-power conditions. The machine includes a turntable with a plurality of grippers for securing a plurality of posts in position during the assembly process and for conveying partially assembled magnetic latch assemblies to each station. At the various stations of the machine, a pin portion of a post is placed and secured in a respective gripper, a magnet is placed over the core of the post, and a casing is assembled over the magnet and post subassembly by press fitting the casing to a flange portion of the post. Subsequent stations include a vacuum station for removing particles as a result of the press fitting operation, a synchronization station, a magnetization station for magnetizing the magnet, a magnetization verification station for verifying the magnetic field strength of the magnetized magnet, a removal station for removing the assembled magnetic latch assembly, and a crash stop assembling station for assembling the magnetic latch assembly to a crash stop.

47 Claims, 7 Drawing Sheets

MACHINE FOR ASSEMBLING A MAGNETIC LATCH ASSEMBLY

BACKGROUND AND SUMMARY OF THE INVENTION

The present invention relates to a machine for assembling a magnetic latch assembly. More particularly, the present invention relates to a multi-station machine for assembling a single point magnetic contact latch assembly, such as the assembly disclosed in U.S. Pat. No.5,343,346, that includes a core with an annularly shaped flange and chamfered pin (hereinafter collectively referred to as "the post"), a magnet, and a casing, the magnetic latch assembly being mounted on a crash stop.

The single point magnetic contact latch assembly has several small components that can be manually assembled together. However, there are problems associated with such manual assembly. For example, the casing which covers the magnet must be press-fitted on the flange of the post with a force sufficient to outwardly radially deform the casing onto the flange so that the casing is secured thereto. An insufficient force will not properly secure the casing to the flange. Components of the latch assembly could thus fall off and potentially damage the hard drive. In addition, if the casing is improperly aligned on the flange, the end of the core which provides the single point of contact may be completely or partially inaccessible to a metal tang portion attached to a read/write arm of the disk drive. Such improper alignment could result in inability to secure or "lock" the read/write arm of the hard drive. Other potential assembly problems may arise during the mounting of the pin of the post to the crash stop. The pin must be properly aligned and secured to the crash stop so that the metal tang portion attached to the read/write arm can be captured by the end of the core. In addition, excessive force applied when mounting the pin to the crash stop may cause stress fractures in the crash stop either destroying it or weakening its structural integrity. Yet another problem associated with manual assembly of the latch is contamination that may result from handling by one or more people. The completed assembly must be as free as possible from particulate matter, dirt, or oils which can interfere with such things as the magnetic medium or read/write head(s) of the disk drive assembly. A further problem associated with manual assembly is the large amount of time required to assemble a single completed magnetic latch assembly and attach it to a crash stop.

A machine for assembling the single point magnetic contact latch assembly and for attaching the assembly to a crash stop that solved the above problems would be a welcome improvement. Such a machine could provide a higher degree of consistency of assembly not available with manual assembly. In addition, higher throughput could be achieved. Such advantages would result in a cost savings because of reduced labor required, fewer parts wasted, and less hard drives damaged.

Accordingly, the present invention includes a machine for assembling a magnetic latch assembly having components that include a post, a magnet, and a casing. The machine includes structure for placing and securing the post in a preferred orientation during assembly of the magnetic latch assembly. First structure is provided for assembling the magnet adjacent a core portion of the post. Second structure is provided for assembling the casing over the magnet and the core portion. Structure is further provided for removing the assembled magnetic latch assembly from the placing and securing structure. In one embodiment, the post placing and securing structure includes a gripper assembly. The gripper assembly may include a fixed jaw having a notch formed therein and a movable jaw, a surface of which adjacent the fixed jaw tapers to define, in cooperation with the notch, an opening to receive the pin portion. Structure for biasing the movable jaw is provided as well as structure for mounting the fixed and movable jaws and the biasing structure to the machine. The movable jaw may have a substantially flat surface formed thereon that is engaged by an actuator that displaces the movable jaw in a direction against the bias of the biasing structure so that the pin portion of the post is insertable and releasably secured between the jaws. The fixed and movable jaws may be formed from 300 series stainless steel that is coated with titanium nitride. Adjacent surfaces of the jaws may include wear-resistant inserts. The wear-resistant inserts may be made from carbide material. The biasing structure may include a spring disposed in a groove formed in the movable jaw. The mounting structure may include a two-piece housing.

The post placing and securing structure may include a first pick-and-place assembly having an end effector thereon. The post placing and securing structure may further include a vibratory feeder bowl having a plurality of posts therein, an in-line feeder, and a dead nest for supplying a single, properly oriented post to the end effector. The post placing and securing means may also further include an overload assembly mounted in the first pick-and-place assembly for alerting an operator of the machine when the end effector attempts to place the post in the securing structure when another post is already there.

The first structure for assembling the magnet adjacent a core portion of the post may include a second pick-and-place assembly having an end effector thereon. The first structure may further include a vibratory feeder bowl having a plurality of magnets therein, an in-line feeder, and a dead nest for supplying a single, properly oriented magnet to the end effector. The first means may further include an overload assembly mounted in the second pick-and-place assembly for alerting an operator of the machine when the end effector attempts to place the magnet over the core when another magnet is already there.

The second structure for assembling the casing over the magnet and the core portion may include a second pick-and-place assembly having an end effector thereon. The machine may further include a ram that engages a plunger assembly of the second pick-and-place assembly that provides a force to press-fit the casing on an annular flange of the post. The second structure may further include a vibratory feeder bowl having a plurality of casings therein, an in-line feeder, and a dead nest for supplying a single, properly oriented casing to the end effector. The second structure may further include an overload assembly mounted in the second pick-and-place assembly for alerting an operator of the machine when the end effector attempts to place the casing over the magnet and the core portion when another casing is already there.

The removing structure may include a first pick-and-place assembly having an end effector thereon. The end effector may include a punch. The removing structure may mount the magnetic latch assembly to a crash stop. The machine may include a ram that engages a plunger assembly of the removing structure to provide a force to press-fit the magnetic latch assembly to the crash stop. The machine may further include structure for securing the crash stop during mounting of the magnetic latch assembly to the crash stop by the removing structure. The crash stop securing means is mounted to the machine.

The crash stop securing structure may include a base having a generally flat portion and a generally upright portion and structure for mounting the crash stop to the base. The crash stop securing structure also includes structure attached to the base for supporting a heel portion of the crash stop. The crash stop securing structure further includes structure formed in the upright portion of the base for facilitating alignment of the crash stop on the base prior to attachment of an assembled magnetic latch assembly to the crash stop. The mounting structure may include a clamp pin mounted in the generally flat portion of the base so as to extend substantially orthogonally from the flat portion of the base and through an opening formed in the crash stop. The mounting structure further includes structure for biasing the clamp pin so that, when the clamp pin is moved against the direction of the bias thereon, it exerts a force on the crash stop that secures the crash stop to the base. The biasing structure may include an O-ring that is disposed in the base so as to surround a peripheral portion of the clamp pin. The alignment facilitating structure may include a groove formed in the upright portion of the base. The supporting structure may include a locator pin driven in the generally upright portion of the base. The locator pin has a substantially flat top surface that extends above the flat portion of the base and abuts against a heel portion of the crash stop. Portions of the base may be recessed so as to provide clearance for an end effector used to place the crash stop onto and remove the crash stop and attached magnetic latch assembly from the crash stop securing structure.

The removing structure may further include an overload assembly mounted in the first pick-and-place assembly for alerting an operator of the machine when the end effector attempts to mount the magnetic latch assembly to the crash stop when another magnetic latch assembly is already there.

The machine may have multiple stations for progressively assembling the magnetic latch assembly. These stations may include a post placement station, a magnet placement station, a casing placing station, and a removal station. The machine may further include a first indexing turntable on which a portion of the post placing and securing structure is mounted. The first indexing turntable advances components of the magnetic latch assembly to the stations of the machine. There may be a plurality of post placing and securing structures mounted on the first indexing turntable at the stations of the machine so that a plurality of magnetic latch assemblies can be simultaneously assembled by the machine.

The machine may further include a crash stop assembly station for mounting the magnetic latch assembly to a crash stop. The crash stop assembly station may include a second indexing turntable and structure for securing the crash stop mounted thereon.

The machine may further include a crash stop removal station for removing the crash stop and mounted magnetic latch assembly from the crash stop securing structure. The second indexing turntable advances the crash stop and the mounted magnetic latch assembly from the crash stop assembly station to the crash stop removal station. The crash stop removal station may include a hand-and-gripper assembly.

The machine may further include a crash stop placement station for placing the crash stop on the crash stop securing structure. The second indexing turntable advances the crash stop from the crash stop placement station to the crash stop assembly station. The crash stop placement station may include an actuator mechanism for placing a crash stop on the crash stop securing structure, a vibratory feeder bowl having a plurality of crash stops therein, an in-line feeder, and a dead nest for supplying a single properly oriented crash stop to the actuator mechanism.

The machine may include a magnetization station having structure for magnetizing the magnet subsequent to placing the casing thereover. The machine may further include a magnetization verification station having structure for verifying that the magnetic field strength of the magnetized magnet of the magnetic latch assembly is within a predetermined range of values. The verifying structure alerts an operator of the machine if the magnetic field strength of the magnetized magnet is outside of the predetermined range. The verifying structure may include a Hall effect sensor.

The machine may include a vacuum station having structure for removing particulate matter from the magnetic latch assembly subsequent to placement of the casing over the magnet and the core.

The invention also includes a method of assembling a magnetic latch assembly having components that include a post, a magnet, and a casing. The steps of the method include grasping and securing the post in a preferred orientation, grasping a magnet in a preferred orientation, placing the magnet over a core portion of the post, grasping a casing in a preferred orientation, placing the casing over the magnet and core, and press-fitting the casing to secure the casing to a portion of the post to thereby form the magnetic latch assembly. The method may also include the step of press-fitting the magnetic latch assembly to a crash stop. An additional step of magnetizing the magnet subsequent to press-fitting the casing to the portion of the post may also be part of the method. The method may further include the step of verifying the magnetic field strength of the magnet subsequent to the step of magnetizing the magnet. A step of removing particulate matter subsequent to pressing the casing to the portion of the post may also be part of the method.

Other objects, advantages and novel features of the present invention will become apparent from the following detailed description of the invention when considered in conjunction with the accompanying drawings.

DETAILED DESCRIPTION OF THE DRAWINGS

Figure 1:
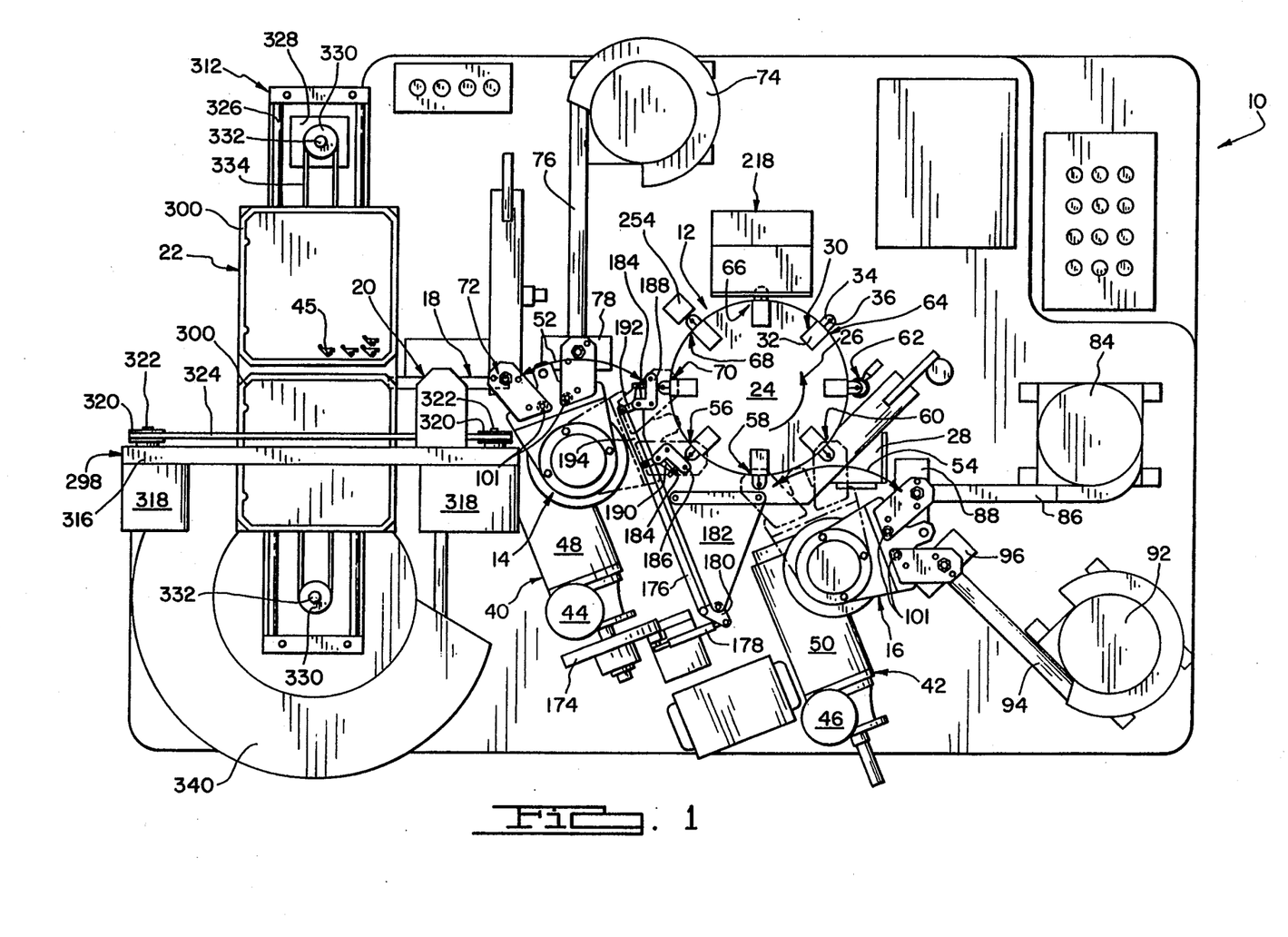
FIG. 1 shows a top view of a machine of the present invention for assembling magnetic latch assemblies.

FIG. 1 shows a top view of machine 10 of the present invention used for assembling single point magnetic contact latch assemblies. Machine 10 includes a horizontal indexing assembly 12, first and second pick-and-place assemblies 14 and 16, a vertical indexing assembly 18, a hand-and-gripper assembly 20, and a tray assembly 22.

Figure 2:
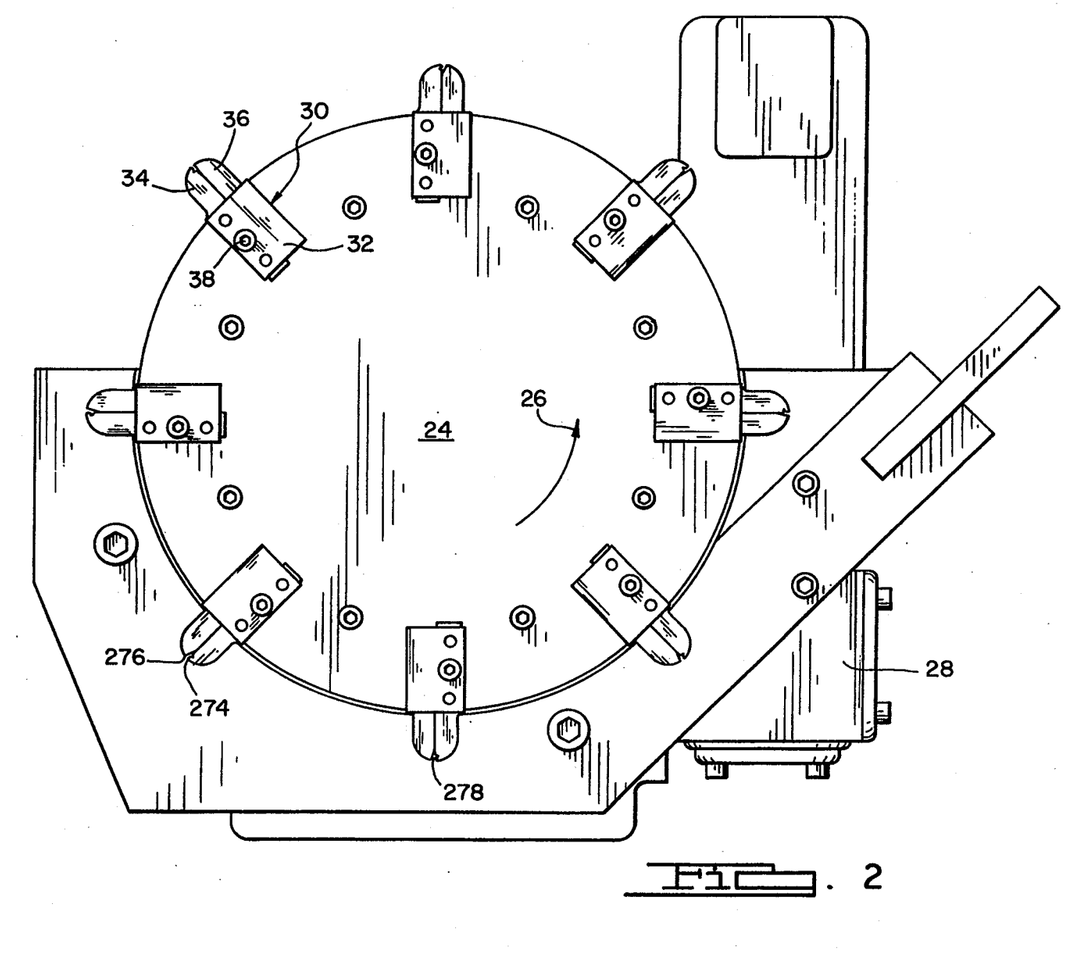
FIG. 2 shows an enlarged view of a horizontal indexing assembly of the machine of the present invention having a plurality of gripper assemblies mounted thereon.

Referring to FIGS. 1 and 2, horizontal indexing assembly 12 includes a first indexing turntable 24 that rotates in a counterclockwise direction generally indicated by arrow 26. Horizontal indexing assembly 12 further includes a motor assembly 28 that rotates first indexing turntable 24 in the counterclockwise direction indicated by arrow 26. Horizontal indexing assembly 12 further includes a plurality of gripper assemblies 30 attached to first indexing turntable 24. Gripper assemblies 30 have a housing 32 in which a fixed jaw 34 and a movable jaw 36 are disposed. Gripper assemblies 30 are fixedly secured to first indexing turntable 24 via a fastener 38 such as a threaded screw or bolt.

Figure 3:
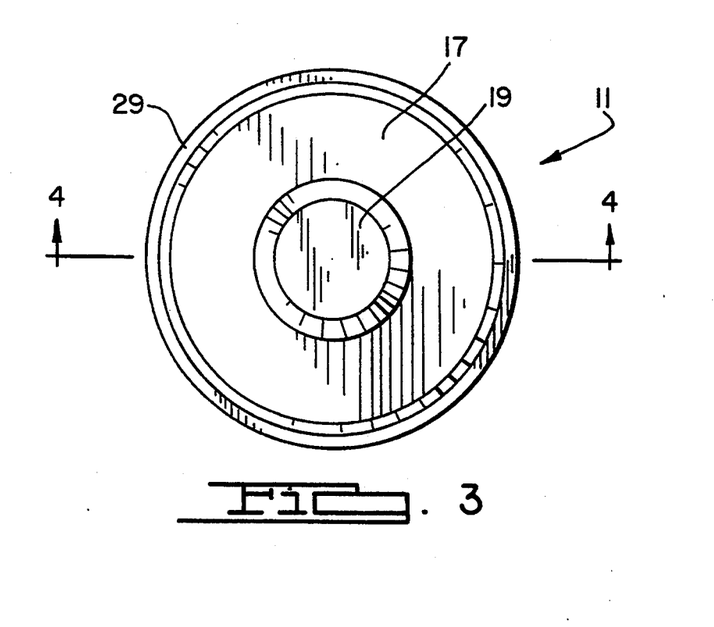
FIG. 3 is a bottom view of the magnetic latch assembly of FIG. 4 assembled by the machine of the present invention.
Figure 4:
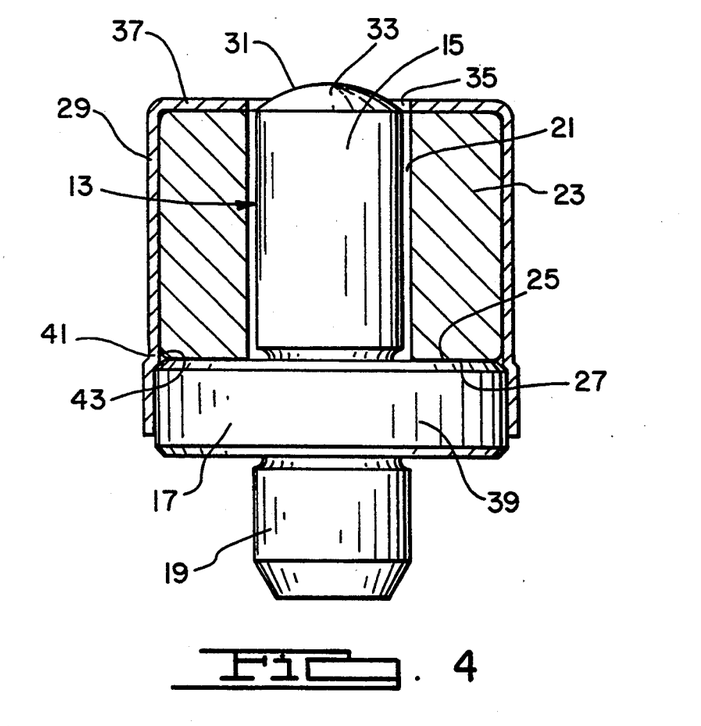
FIG. 4 is a sectional view taken along line 4—4 of FIG. 3.

FIGS. 3 and 4 show a magnetic latch assembly 11 assembled by machine 10 of the present invention. Magnetic latch assembly 11 has a post 13 that includes a core 15, an annular flange 17, and a chamfered pin 19. Core 15 is axially received in a central bore 21 of a magnet 23 so that a first face 25 of annular flange 17 abuts a second end 27 of magnet 23. Chamfered pin 19 is used to attach magnetic latch assembly 11 to a projection in a heel portion of a crash stop (not shown in FIGS. 3 and 4) as will be discussed below.

Core 15 and magnet 23 are disposed and positioned within casing 29 which is a hollow cylindrically shaped shell having an axial length larger than the axial length of magnet 23. Nose 31 is curvilinear in shape, formed on first end 33 of core 15, and extends through opening 35 formed in partially closed end 37 of casing 29.

Casing 29, magnet 23, and core 15 are secured together by a press-fit that exists between casing 29 and an outer periphery 39 of annular flange 17. The press-fit results in an outward radial deformation 41 of inner peripheral surface 43 of casing 29 caused by the abutment of outer periphery 39 of annular flange 17 and inner peripheral surface 43 of casing 29.

Referring again to FIG. 1, first and second pick-and-place assemblies 14 and 16 include motor drive assemblies 40 and 42. Motor drive assemblies 40 and 42 include electric motors 44 and 46 and drive shaft assemblies 48 and 50. As can be seen in FIG. 1, motor drive assemblies 40 and 42 reciprocally move first and second pick-and-place assemblies 14 and 16 in the directions generally indicated by arrows 52 and 54.

Machine 10 has a plurality of stations at which the components of the single point magnetic contact latch assembly 11 are assembled together. Briefly, these stations include post placement station 56 where pin 19 of post 13 of magnetic latch assembly 11 is placed in a gripper assembly 30, magnet placement station 58 where magnet 23 is placed on core 15 of post 13, casing placement station 60 where casing 29 is placed over magnet 23 and core 15 and press-fitted onto flange 17, vacuum station 62 where any particulate matter resulting from pressfitting casing 29 onto flange 17 is removed, a dwell station 64 used for synchronization purposes, a magnetization station 66 where the magnet 23 is magnetized, a magnetization verification station 68 where the magnetic field strength of magnetic latch assembly 11 is tested to verify that it is within a predetermined range, a removal station 70 where magnetic latch assembly 11 is removed from first indexing turntable 24, and a crash stop assembly station 72 where magnetic latch assembly 11 is attached to a crash stop 45.

Components for the magnetic latch assembly 11 are supplied to various stations of machine 10 via vibratory feeder bowls, in-line feeders and dead nests. The vibratory feeder bowls may have vacuums therein to aid in the removal of particulate matter from the components of the magnetic latch. Posts 13 are supplied to machine 10 via vibratory feeder bowl 74, in-line feeder 76, and dead nest 78. Posts 13 are supplied and properly oriented by the combination vibratory feeder bowl 74, in-line feeder 76 and dead nest 78. Dead nest 78 secures a single post 13 so that it can be selected and held in an end effector (see FIG. 5) of a first hand 80 of first pick-and-place assembly 14. Magnets 23 are supplied to an end effector (see FIG. 6) attached to second hand 82 of second pick-and-place assembly 16 via vibratory feeder bowl 84, in-line feeder 86, and dead nest 88. As with vibratory feeder bowl 74 and in-line feeder 76, vibratory feeder bowl 84, in-line feeder 86, and dead nest 88 supply properly oriented magnets 23 to dead nest 88 in a straight line. Dead nest 88 secures a single magnet 23 so that an end effector connected to second hand 82 of second pick-and-place assembly 16 can grasp and hold it. Casings 29 are supplied to an end effector (see FIG. 6) attached to first hand 90 of second pick-and-place assembly 16 via vibratory feeder bowl 92, in-line feeder 94, and dead nest 96. Vibratory feeder bowl 92, in-line feeder 94, and dead nest 96 supply a single line of properly oriented casings 29 to dead nest 96. Dead nest 96 secures a casing 29 so that it can be selected and held by the end effector attached to first hand 90 of second pick-and-place assembly 16.

Figure 5:
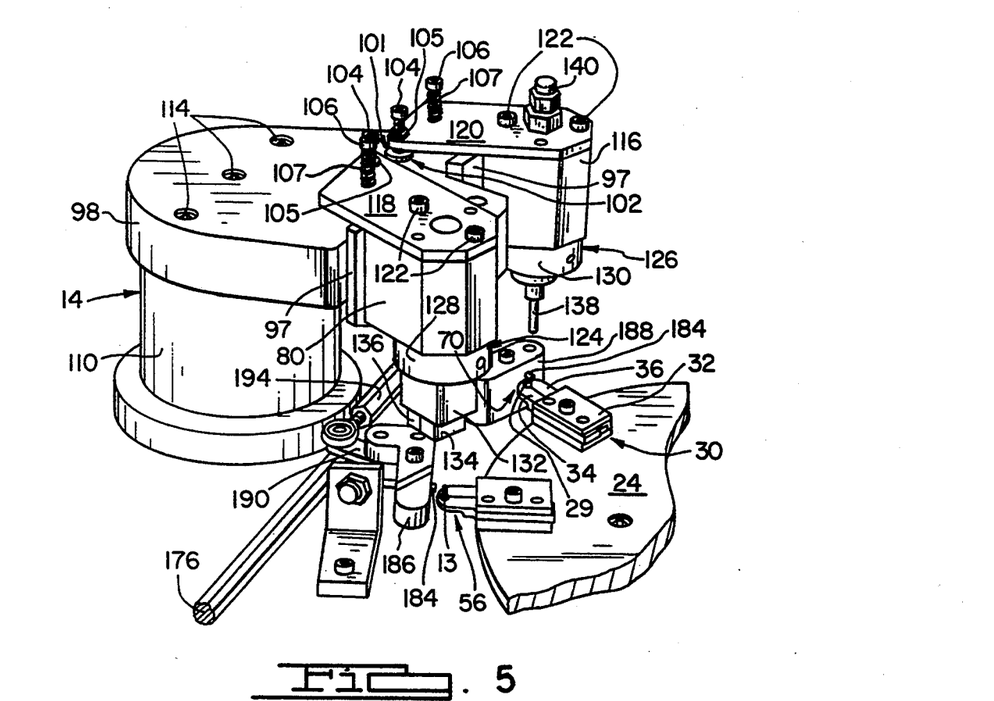
FIG. 5 shows a perspective view of a pick-and-place unit having end effectors thereon for placing and removing components from the jaws of the gripper assemblies mounted on an indexing turntable.
Figure 6:
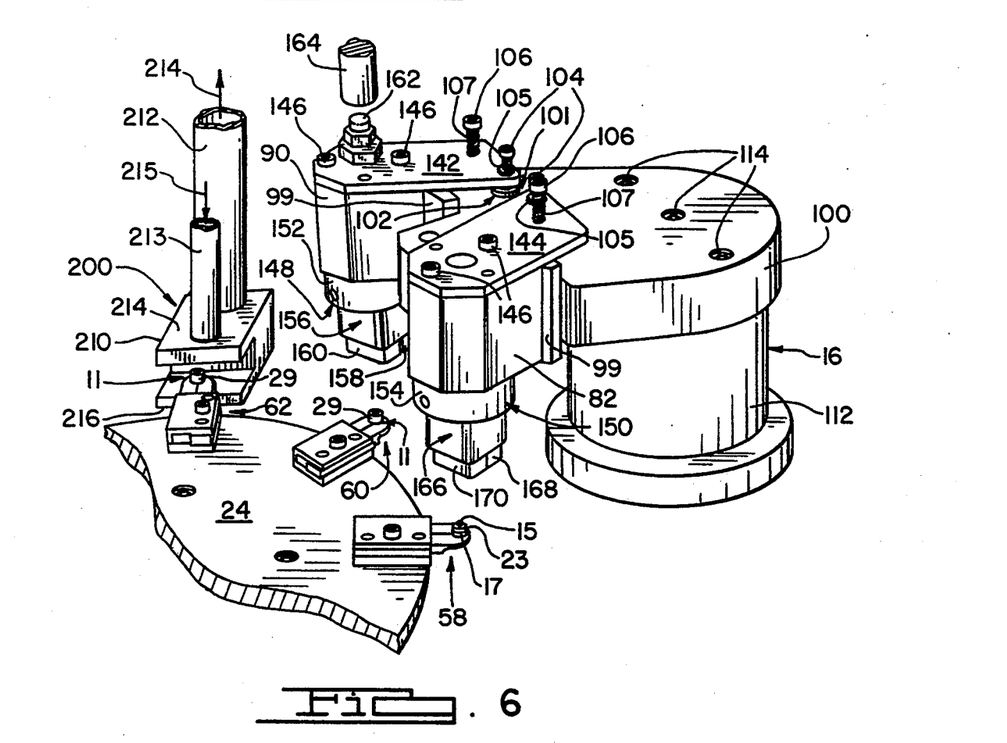
FIG. 6 shows a perspective view of a pick-and-place unit having end effectors thereon and a vacuum assembly which are utilized in three separate stations of the machine of the present invention.

Referring to FIGS. 5 and 6, the components of first and second pick-and-place assemblies 14 and 16 will be described. First and second pick-and-place assemblies 14 and 16 include respective arm portions 98 and 100 that are secured to base portions 110 and 112 via a plurality of fasteners 114. First pick-and-place assembly 14 has an above-described first hand 80 and second hand 116. First and second hands 80 and 116 are movably connected to arm portion 98 via runner block and guide rail assembly 97. First and second hands 90 and 82 are movably connected to arm portion 100 via runner block and guide rail assembly 99. Top plates 118 and 120 are respectively secured to first and second hands 80 and 116 via fasteners 122. End effectors 124 and 126 are respectively attached to first and second hands 80 and 116 via clamp rings 128 and 130. End effector 124 has a gripper 132 that includes a pair of fingers, 134 and 136. End effector 126 has a punch 138 attached thereto that is at least partially hollow. Punch 138 is driven in a generally downward direction by a plunger assembly 140 disposed through top plate 120 and second hand 116 and drivingly connected to end effector 126.

Top plates 142 and 144 are shown in FIG. 6 as being respectively attached to first and second hands 90 and 82 of second pick-and-place assembly 16 via fasteners 146. End effectors 148 and 150 are respectively attached to first and second hand portions 90 and 82 via clamp rings 152 and 154. End effector 148 has a gripper 156 attached thereto that includes a pair of fingers 158 and 160. Gripper 156 is driven in a generally downward direction via a plunger assembly 162 that is disposed through top plate 142 and first hand 90 and drivingly connected to end effector 148. Plunger assembly 162 is driven via a ram 164. Ram 164 actuates plunger assembly 162 which drives end effector 148 and gripper 156 thereof in a downward direction. Pressing both end effector 148 and gripper 156 attached thereto rather than removing end effector 148 and gripper 156 thereof and then pressing with ram 164 and another alignment device or devices (not shown), has the advantage of eliminating an extra component or components of machinery otherwise necessary to ensure proper alignment of the components of magnetic latch assembly 11 prior to press-fitting them together. End effector 150 also has a gripper 166. Gripper 166 has first and second fingers 168 and 170.

An overload assembly 101 is provided for first and second hands 80 and 116 of first pick-and-place assembly 14 as well as first and second hands 90 and 82 of second pick-and-place assembly 16. Overload assembly 101 is shown in FIGS. 5 and 6 as well as diagrammatically in FIG. 1. Overload assembly 101 j.s designed to shut machine 10 off and/or alert an operator thereof when an end effector 124, 126, 148, or 150 attempts to place a component of magnetic latch assembly 11 in either a gripper assembly 30 or base (discussed below) when a component is already there. This is designed to prevent damage to machine 10 as well as enhance quality control of the magnetic latch assemblies 11 it assembles.

Each overload assembly 101 includes a proximity switch 102. Switches 102 sense the presence of switch contacts 104 mounted in top plates 118, 120, 142, and 144. Switch contacts 104 are secured to top plates 118, 120, 142, and 144 by retention nuts 105. Retention nuts 105 control the depth of the insertion of switch contacts 104 in top plates 118, 120, 142, and 144. Fasteners 106 connect top plates 118 and 120 to arm portion 98 and top plates 142 and 144 to arm portion 100. Fasteners 106 are disposed through springs 107. Springs 107 bias top plates 118, 120, 142, and 144 in a downward direction such that switches 102 sense the presence of contacts 104. In the event that an end effector attempts to place a component or magnetic latch assembly in either a gripper assembly 30 or base (discussed below) when such a component is already there, a force is exerted on spring 107 opposite in direction to that of its bias that causes a hand and top plate to move upward. This upward movement results in switch contact 104 no longer being near a switch 102. Because switch 102 no longer senses the presence of contact 104, it either opens or closes (depending on its construction) which in turn causes machine 10 to either shut down and/or alert the operator thereof as discussed above.

In operation, referring to FIGS. 5 and 6, first hand 80 of first pick-and-place assembly 14 grasps a post 13 from dead nest 78 and moves toward first indexing turntable 24 in the direction generally indicated by arrow 52. First hand 80 moves post 13 to post placement station 56. A cam 174 is shown as being drivingly attached to drive shaft assembly 48. Cam 174 drivingly engages linkage 176 via bell crank 180 which is attached to support 182 and linkage 178. Linkage 176 causes actuator pins 184 to move in a direction towards and away from first indexing turntable 24. Actuator pins 184 are disposed in frames 186 and 188. Actuator pin 184 disposed in frame 186 is drivingly attached to linkage 176 via actuator arm 190. Actuator pin 184 disposed in frame 188 is drivingly connected to linkage 176 via actuator arm 192 that is drivingly connected to connecting rod 194 which is attached to linkage 176.

As first hand 80 of first pick-and-place assembly 14 moves post 13 to post placement station 56, actuator pin 184 moves toward first indexing turntable 24 and pushes against movable jaw 36 so as to open it as will be more fully discussed below. Gripper 132 and first and second fingers 134 and 136 thereof place pin 19 of post 13 into gripper assembly 30 and actuator pin 184 moves away from first indexing turntable 24 so as to release movable jaw 36 such that gripper assembly 30 fixedly secures pin 19 therein. First indexing turntable 24 advances post 13 to magnet placement station 58 which is shown in FIG. 1 and also shown in more detail in FIG. 6. End effector 150 attached to second hand 82 of second pick-and-place assembly 16 secures a magnet 23 between first and second fingers 168 and 170 thereof from dead nest 90. End effector 148 attached to first hand 90 of second pick-and-place assembly 16 secures a casing 29 between fingers 158 and 160 of gripper 156 thereof from dead nest 88. Second pick-and-place assembly 16 moves towards first indexing turntable 24 in the direction generally indicated by arrow 54. As can be seen in FIG. 6, end effector 150 places magnet 23 onto core 15 of post 13. First indexing turntable 24 is then advanced in a counterclockwise direction indicated by arrow 26. Casing 29 is placed onto core 15 and magnet 23 via downward movement of end effector 148 and gripper 156 toward first indexing turntable 24. Ram 164 moves into engagement with plunger assembly 162 so as to press-fit casing 29 onto flange 17 of post 13. First indexing turntable 24 is then advanced in a counterclockwise direction indicated by arrow 26 toward vacuum station 62.

Vacuum station 62 includes a vacuum assembly 200 that has a shroud 210 and a vacuum hose 212 which draws air in a generally upward direction indicated by arrow 214. A blow off hose 213 is located at top 214 of shroud 210. Hose 213 blows air in a generally downward direction indicated by arrow 215. A blow off hose 213 is also located at bottom 216 of shroud 210 but not shown in FIG. 6. This blow off hose 213 blows air in a generally upward direction. Particulate matter removed as a result of the air blown by hoses 213 is drawn through vacuum hose 212 attached to shroud 210 and thereby removed from magnetic latch assembly 11.

Subsequent to the removal of particulate matter at vacuum station 62, first indexing turntable 24 is advanced in a counterclockwise direction indicated by arrow 26 to dwell station 64 where no operation is performed. Dwell station 64 is intended for timing purposes. First indexing turntable 24 is again indexed in a counterclockwise direction indicated by arrow 26 such that magnetic Latch assembly 11 is advanced to magnetization station 66 which has a magnet assembly 218.

Figure 7:
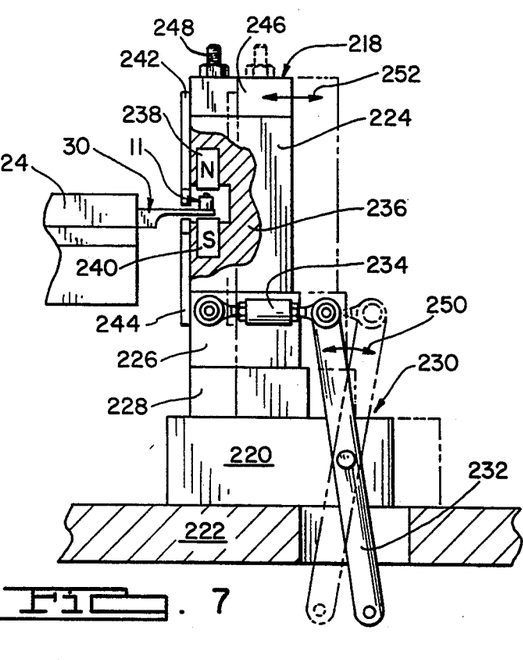
FIG. 7 shows a side view of a magnetizer of the machine of the present invention used to magnetize the magnet of a magnetic latch assembly.

FIG. 7 shows a side view of a magnet assembly 218 of machine 10 of the present invention. Magnet assembly 218 has a first riser block 220 that is connected to a base portion 222 of machine 10. Magnet assembly 218 includes a body 224 that has a second riser block 226 which is connected to a runner block 228 mounted on first riser block 220. Actuator mechanism 230 includes linkage 232 and a connecting rod 234 attached to second riser block 226 and linkage 232.

Body 224 has a cavity 236 in which magnetic latch assembly 11 and a portion of gripper assembly 30 are disposed so that magnet 23 can be magnetized by north pole magnet 238 and south pole magnet 240 disposed within cavity 236. Although only a single north pole magnet 238 and south pole magnet 240 are shown disposed within cavity 236 in FIG. 7, it is to be understood that magnet assembly 218 may have a plurality of north pole magnets 238 and south pole magnets 240. Magnet assembly 218 further includes face plates 242 and 244 and a top plate 246 connected to body 224 via a fastener 248. Fastener 248 may include such things as a threaded screw or a threaded bolt and nut.

In operation, linkage 232 can be reciprocally driven in the directions generally indicated by arrows 250 such that magnet assembly 218 reciprocally moves in the direction generally indicated by arrows 252. Magnet assembly 218 can be moved toward first indexing turntable 24 so that magnetic latch assembly 11 and a portion of a gripper assembly 30 are disposed in cavity 236. This allows magnet 23 to be magnetized. Subsequent to magnetization of magnet 23, magnet assembly 218 can be moved away from first indexing turntable 24 so that magnetic latch assembly 11 can be indexed to magnetization verification station 68.

Magnetization verification station 68 includes a magnetic field intensity sensor 254. Magnetic field intensity sensor 254 may include a Hall effect sensor, gauss meter, or other similar measurement device. Magnetic field intensity sensor 254 is utilized to determine whether magnet assembly 218 magnetized magnet 23 within a predetermined range of values. If this range is met, first indexing turntable 24 advances in a counterclockwise direction indicated by arrow 26 to removal station 70. However, if the magnetic field strength of magnet 23 is not within the predetermined range of values, magnet field intensity sensor 254 can shut down machine 10 and/or sound an alarm to alert an operator thereof that magnetic latch assembly 11 should be removed from gripper assembly 30 prior to restarting machine 10. This feature helps improve quality control of completed magnetic latch assemblies.

Figure 8:
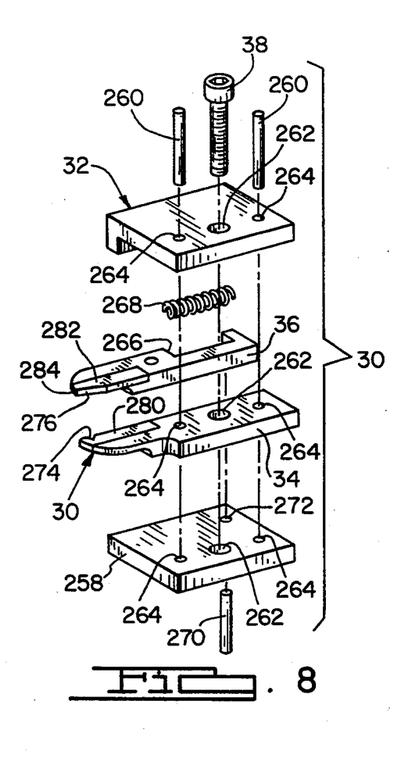
FIG. 8 shows an exploded perspective view of a gripper assembly of the present invention.

FIG. 8 shows an exploded perspective view of a gripper assembly 30 of machine 10 of the present invention. As discussed above, gripper assembly 30 includes a housing 32, a fixed jaw 34, a movable jaw 36, and a fastener 38 for connecting gripper assembly 30 to first indexing turntable 24. As can be seen in FIG. 8, housing 30 is formed from an upper housing portion 256 and a lower housing portion 258. Housings 256 and 258 are interconnected together via fastener 38 and a plurality of pins 260 which are disposed in respective openings 262 and 264 formed in upper and lower housing portions 256 and 258 as well as fixed jaw 34.

Movable jaw 36 has a slot 266 formed therein in which a spring 268 having a predetermined coefficient is disposed therein. A pin 270 extends through opening 272 formed in lower housing portion 258 and into slot 266 behind spring 268. Pin 270 provides a fixed connection to housing 32 so that spring 268 can bias movable jaw 36.

Fixed jaw 34 has a notch 274 formed therein that cooperates with tapering edge 276 so as to define an opening 278 (see FIG. 2) for receiving and fixedly securing pin 19 of post 13 therein. Referring again to FIG. 8, both fixed and movable jaws 34 and 36 are shown as having respective wear inserts 280 and 282. Wear inserts 280 and 282 are designed to reduce frictional wear that normally occurs between notch 274 and tapering edge 276 of respective jaws 34 and 36 which come into contact during movement of movable jaw 36. In one embodiment, fixed and movable jaws 34 and 36 are formed from 300 Series stainless steel that is coated with titanium nitride and the wear resistant inserts are made from a carbide material. Although wear resistant inserts 280 and 282 are shown, it is to be understood that they are optional and that fixed and movable jaws 34 and 36 may be formed without them.

A generally flat portion 284 is shown as being formed on movable jaw 36. Generally flat portion 284 interacts with actuator pins 184, as discussed above, so as to displace movable jaw 36 in a direction opposite that of the bias force applied by spring 268 such that pin 19 of post 13 can be inserted in opening 278 between notch 274 and tapering edge 276. Although a generally flat portion 284 is shown, it is to be understood that other equivalent shapes may be formed on movable jaw 36 for cooperating with actuator pin 184 to open movable jaw 36 against the direction of the bias force applied by spring 268.

Referring to FIGS. 1 and 6, when magnetic latch assembly 11 is advanced by first indexing turntable 24 to removal station 70, punch 138 of end effector 126 is moved in a generally downward direction by a ram or press 294 (see FIG. 9) acting on plunger assembly 140 such that at least a portion of magnetic latch assembly 11 is disposed in the hollow portion of punch 138. Actuator pin 184 pushes against generally flat portion 284 of movable jaw 36 so as to release pin 19 secured in opening 278 from gripper assembly 30. First pick-and-place assembly 14 moves in a direction away from first indexing turntable 24 generally indicated by arrow 52 over to vertical indexing assembly 18.

Figure 9:
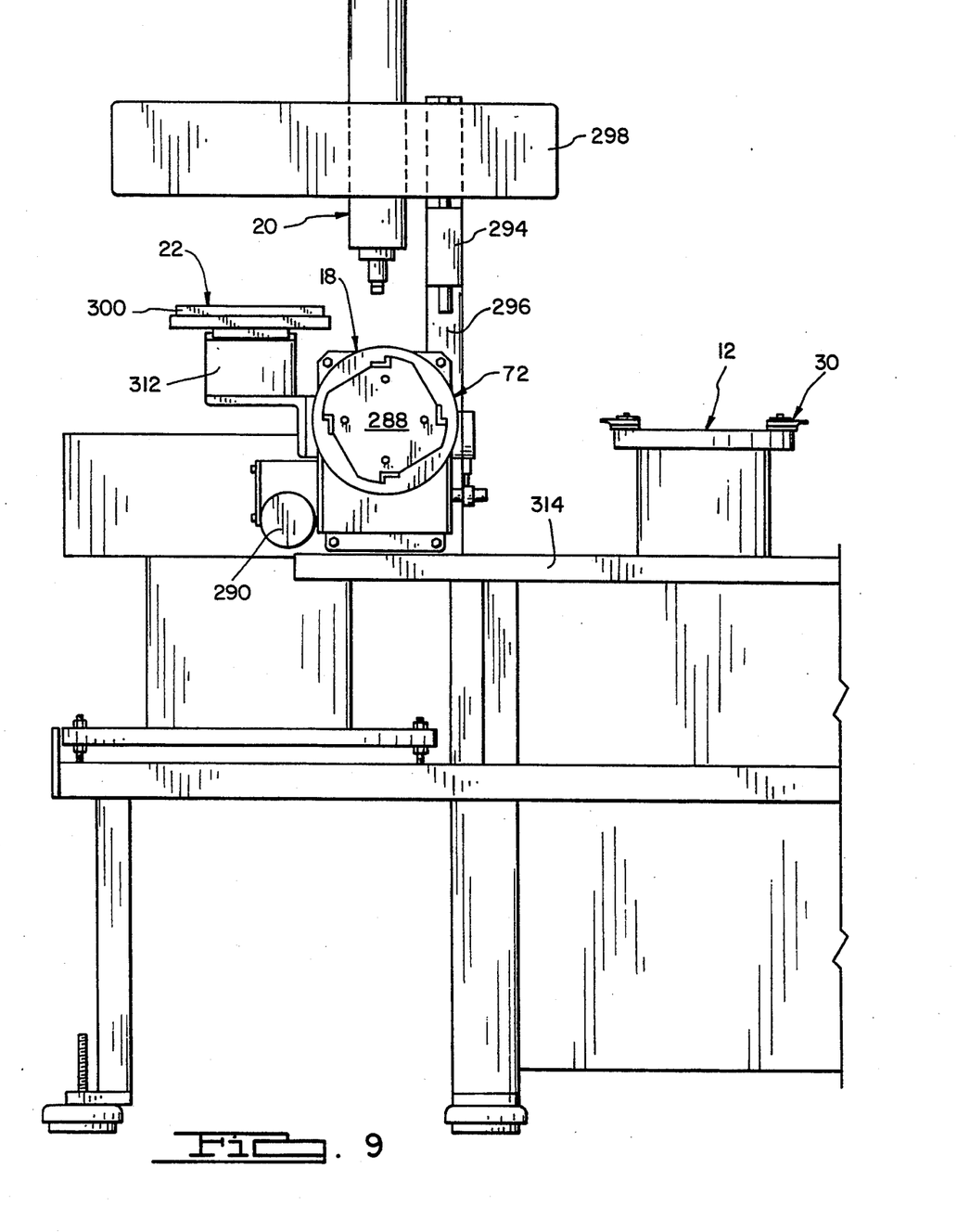
FIG. 9 shows a side view of a vertical indexing assembly, hand-and-gripper assembly, and tray assembly of the present invention.

FIG. 9 shows a side view of the major components of vertical indexing assembly 18, hand-and-gripper assembly 20, and tray assembly 22. Vertical indexing assembly 18 includes a second indexing turntable 288 which is drivingly connected to a motor 290. Motor 290 rotates turntable 288 in a counterclockwise direction generally indicated by arrow 292 (see FIG. 10). Vertical indexing assembly 18 further includes a press or ram 294 that is mounted on a support 296, the function of which will be discussed below in connection with FIG. 10. FIG. 9 also shows a guide rail and drive mechanism 298 that mechanically moves and supports hand-and-gripper assembly 20. FIG. 9 further shows a tray 300 (see also FIG. 1) of tray assembly 22 on which completed magnetic latch assemblies 11 that have been mounted on crash stops 45 are placed and a guide rail and drive mechanism 312 on which trays 300 are movably disposed as will be discussed below in connection with FIG. 10. Finally, FIG. 9 shows vertical indexing assembly 18, horizontal indexing assembly 12, hand-and-gripper assembly 20, and tray assembly 22 fixedly secured to frame 314 of machine 10.

FIG. 1 shows guide rail and drive mechanism 298 as including a frame portion 316 and a motor 318 that drives pulleys 320, mounted on shafts 322 of motor 318. A belt 324 is connected to pulleys 320. FIG. 1 also shows guide rail and drive mechanism 312 as including a frame 326 and a motor 328 that drives pulleys 330, mounted on shafts 332 of motor 328. A belt 334 is connected to pulleys 330.

Figure 10:
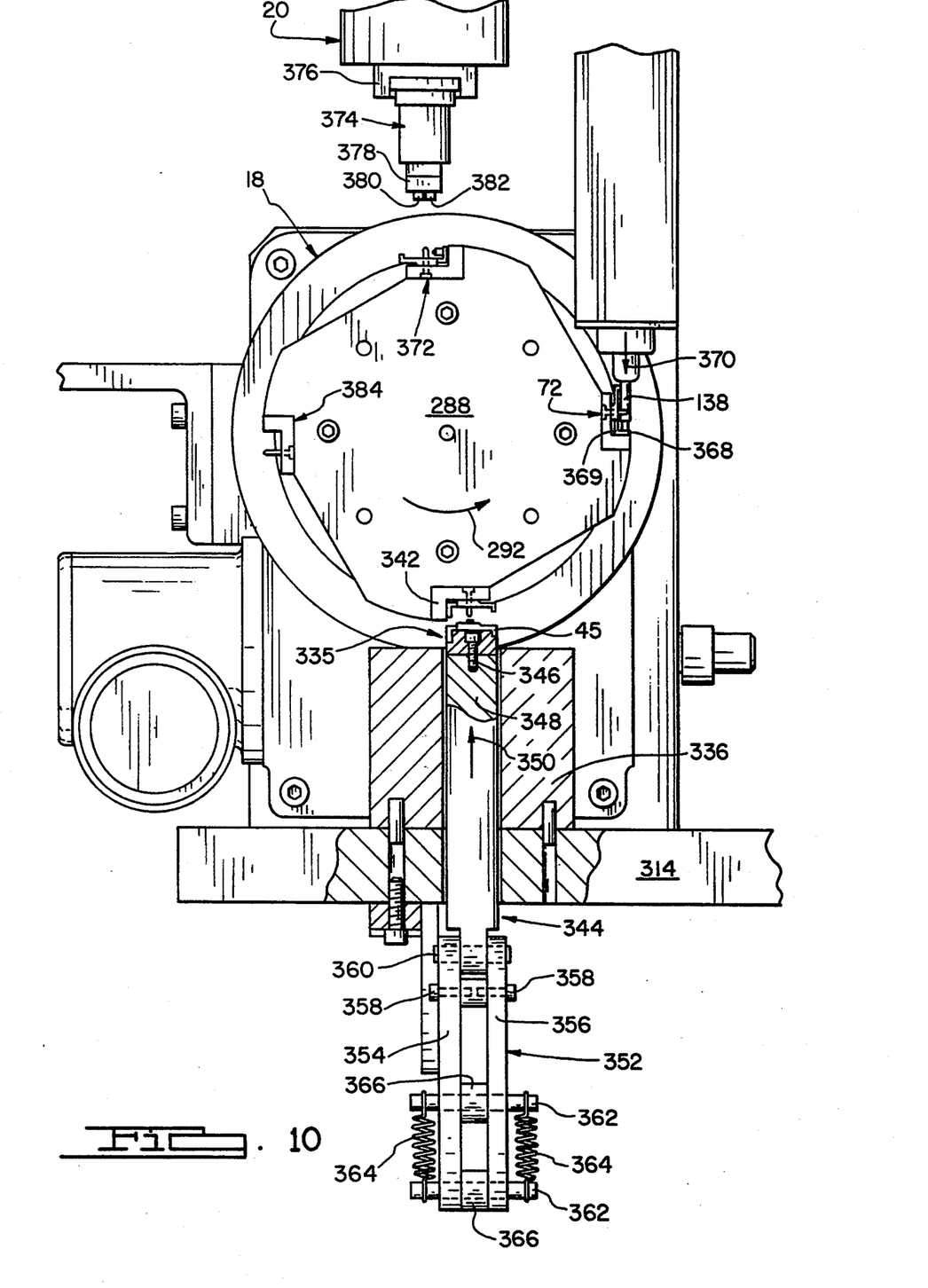
FIG. 10 shows an enlarged view of portions of the vertical indexing assembly and hand-and-gripper assembly of FIG. 9.

FIG. 10 shows an enlarged view of a portion of vertical indexing assembly 18 and hand-and-gripper assembly 20. A crash stop placement station 335 includes a dead nest 336 which holds a crash stop 45 supplied via vibratory feeder bowl 340 (see FIG. 1) for positioning on a base or nest 342. Base 342 is secured to second indexing turntable 288. Crash stop 45 is mounted on base 342 via an actuator mechanism 344 which is disposed through a portion of dead nest 336. Actuator mechanism 344 includes a crash stop retainer 346, a portion of which is disposed through crash stop 45 so as to releasably secure the same to base 342. Rod 348 of actuator mechanism 344 moves in the direction indicated by arrow 350 via mechanical linkage 352 that is reciprocally driven by a motor (not shown). Mechanical linkage 352 includes a pair of links 354 and 356 that are drivingly connected to rod 348 via fasteners 358 and pin 360. Additional pins 362 as well as springs 364 and rockers 366 drivingly connect links 352 and 354 to the motor.

Subsequent to the placement of a crash stop 45 in a base 342, second indexing turntable 288 advances in a counterclockwise direction indicated by arrow 292 to crash stop assembly station 72 where magnetic latch assembly 11 is attached to crash stop 45 via a press-fit of pin 19 within an opening (not shown) in a projection 368 of a heel portion 369 of crash stop 45. The press-fit is accomplished via movement of punch 138 in which magnetic latch assembly 11 is disposed in a generally downward direction indicated by arrow 370. Punch 138 is moved in a downward direction indicated by arrow 370 by ram 294 (see FIG. 9) that acts on plunger assembly 140 of second hand 116 (see FIG. 5). Pressing both punch 138 and magnetic latch assembly 11 simultaneously rather than positioning magnetic latch assembly 11 in the opening of projection 368 of crash stop 45 with punch 138 and then removing punch 138 and pressing with ram 294 and an additional alignment tool or tools (not shown) has the advantage of eliminating both an extra step and additional equipment necessary for the operation of machine 10. This has both time savings and cost savings advantages.

Subsequent to mounting of magnetic latch assembly 11 on crash stop 45, second indexing turntable 288 is indexed in a counterclockwise direction indicated by arrow 292 to crash stop removal station 372 where crash stop 45 and mounted magnetic latch assembly 11 are removed by hand-and-gripper assembly 20. Hand-and-gripper assembly 20 includes an end effector 374 attached to hand-and-gripper assembly 20 via a coupler 376. End effector 374 has a palletizing gripper 378 that includes fingers 380 and 382 drivingly attached thereto. In operation, fingers 380 and 382 surround and remove crash stop 45 and mounted magnetic latch assembly 11 from base 342 and place it on tray 300 (see FIGS. 1, 9, and 10). Referring to FIG. 1, it can be seen that there are a plurality of trays 300 that can be horizontally moved via guide rail and drive mechanism 312 so that when one tray 300 is filled, it can be moved from the general vicinity of hand-and-gripper assembly 20 and vertical indexing assembly 18 so that another empty or partially empty tray 300 can be filled. Filled trays 300 can be removed by an operator or other machinery.

Subsequent to removal of crash stop 45 and mounted magnetic latch assembly 11 from base 342, second indexing turntable 288 indexes in a counterclockwise direction indicated by arrow 292 to dwell position 384. As with dwell station 64, dwell position 384 is intended for timing purposes. Subsequent to dwell position 384, second indexing turntable 288 is indexed in a counterclockwise direction indicated by arrow 292 so that another crash stop 45 can be secured to base 342 via actuator mechanism 344 at crash stop placement station 335. It should be noted that multiple components of the magnetic latch assembly, namely, posts 13, magnets 23, and casings 29, as well as crash stops 45, can be present on horizontal and vertical indexing assemblies 12 and 18 during the operation of machine 10. That is, multiple magnetic latch assemblies 11 can be in various states of partial assembly and completed assembly on machine 10 at a given time. Tests have shown that machine 10 is capable of assembling fourteen (14) magnetic latch assemblies 11 that are connected to crash stops 45 per minute.

Figure 11:
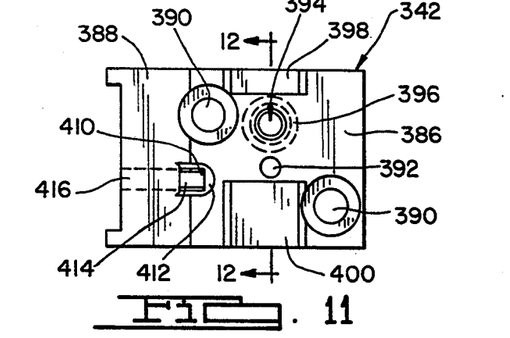
FIG. 11 shows a top view of a base or nest assembly of the present invention.
Figure 12:
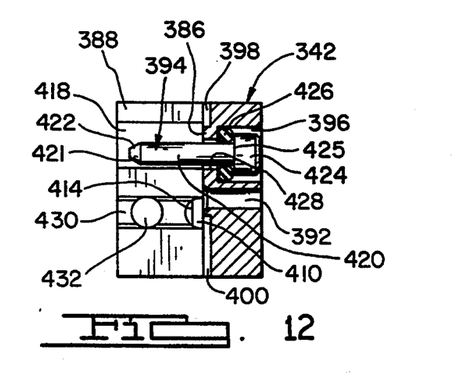
FIG. 12 shows a cross-sectional view of FIG. 11 taken along line 12—12 of thereof.

Referring to FIGS. 11 and 12, structural characteristics of base 342 will be described. FIG. 11 shows a top view of base 342 that holds and positions crash stops 45 on second indexing turntable 288. Base 342 includes a generally flat portion 386 and a generally upright portion 388 that extends substantially orthogonally from a generally flat portion 386. Base 342 may be formed such that generally flat portion 386 and generally upright portion 388 are unitary. However, such construction is not required. Generally flat portion 386 includes a plurality of holes 390 for mounting base 342 to second indexing turntable 288. Fasteners (not shown) would extend through holes 390 and connect base 342 to second indexing turntable 288. Another hole 392 is shown as being formed at least partially through generally flat portion 386. Hole 392 is intended to receive a post (not shown) formed on crash stop 338 to aid in the secural thereof on base 342. A clamp pin 394 is shown as being disposed in an opening 396 formed in generally flat portion 386. Clamp pin 394 extends substantially orthogonally from generally flat portion 386. Clamp pin 394 extends through an opening (not shown) in crash stop 45 so as to fixedly secure it to base 342 as will be described more fully below with reference to FIG. 12.

Pockets 398 and 400 are shown as being formed in generally flat portion 386 of base 342. Pockets 398 and 400 provide grooves or wells in which fingers 380 and 382 of palletizing gripper 378 can be disposed. This helps fingers 380 and 382 better grip and surround a crash stop 45.

A locator pin 410 is shown as being connected in generally upright portion 388 near the intersection of the connection of generally flat portion 386 with generally upright portion 388. Locator pin 410 is disposed in an opening 412 formed in generally flat portion 386. Locator pin 410 has a generally flat portion 414 which abuts against heel portion 369 of crash stop 338. Flat portion 414 provides support to the heel portion 369 during the press-fit of magnetic latch assembly 11 into an opening (not shown) in projection 368 of crash stop 45. Locator pin 410 is connected to generally upright portion 388 via a post 416 that is secured therein.

FIG. 12 shows a cross-sectional view taken through FIG. 11 along line 12—12 thereof. A groove 418 is formed in generally upright portion 388 to provide clearance for a fastener (not shown) that is inserted in hole 390 to secure base 342 to second indexing turntable 288. Groove 418 can also be seen in FIG. 11. Referring again to FIG. 12, the shape of clamp pin 394 can better be appreciated. Clamp pin 394 includes a generally elongate post portion 420 having a chamfered or tapered edge 422 formed on an end 421 thereof. Chamfered edge 422 facilitates insertion of post portion 420 of clamp pin 394 in the hole (not shown) formed in crash stop 45. An enlarged flange 424 is formed on an opposite end 425 of post portion 420. Post portion 420 is disposed through an opening in O-ring 426 such that O-ring 426 lies adjacent step 428 of opening 396 and flange 424. An alignment groove 430 is provided in generally upright portion 388 for facilitating proper alignment of crash stop 45 on base 342. Proper alignment of crash stop 45 on base 342 is desired so that magnetic latch assembly 11 is properly positioned and press-fitted onto projection 368 of heel portion 369 of crash stop 45. An opening 432 is shown as being formed in generally upright portion 388 for use with a fastener (not shown) to further aid in the attachment of base 342 to second indexing turntable 288.

In operation, clamp pin 394 is biased by O-ring 426 such that when crash stop 45 is placed thereon, pin 394 is laterally moved in order to fit within the opening (not shown) formed in crash stop 45. The lateral movement of clamp pin 394 causes O-ring 426 to exert a force in a direction generally opposite the direction of the lateral movement of clamp pin 394 such that crash stop 45 is fixedly secured to base 342.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A machine for assembling a magnetic latch assembly having components that include a post, a magnet, and a casing, comprising:
   means for placing and securing the post in a preferred orientation during assembly of the magnetic latch assembly;
   first means for assembling the magnet adjacent a core portion of the post;
   second means for assembling the casing over the magnet and the core portion; and
   means for removing the assembled magnetic latch assembly from the placing and securing means.

2. The machine of claim 1, wherein said post placing and securing means includes a gripper assembly.

3. The machine of claim 2, wherein said gripper assembly includes a fixed jaw and a movable jaw.

4. The machine of claim 3, further comprising means for actuating said movable jaw of said gripper assembly so that a pin portion of the post may be inserted and releasably secured between said jaws of said gripper assembly.

5. The machine of claim 1, wherein said post placing and securing means includes a pick-and-place assembly having an end effector thereon.

6. The machine of claim 5, wherein said post placing and securing means further includes a vibratory feeder bowl having a plurality of posts therein, an in-line feeder, and a dead nest for supplying a single, properly oriented post to said end effector.

7. The machine of claim 5, wherein said post placing and securing means further includes an overload assembly mounted in said pick-and-place assembly for alerting an operator of the machine when said end effector attempts to place the post in said securing means when another post is already there.

8. The machine of claim 1, wherein said first means includes a pick-and-place assembly having an end effector thereon.

9. The machine of claim 8, wherein said first means further includes a vibratory feeder bowl having a plurality of magnets therein, an in-line feeder, and a dead nest for supplying a single, properly oriented magnet to said end effector.

10. The machine of claim 8, wherein said first means further includes an overload assembly mounted in said pick-and-place assembly for alerting an operator of the machine when said end effector attempts to place the magnet over the core when another magnet is already there.

11. The machine of claim 1, wherein said second means includes a pick-and-place assembly having an end effector thereon.

12. The machine of claim 11, further comprising a ram that engages a plunger assembly of said pick-and-place assembly, said ram providing a force for press-fitting the casing on an annular flange of the post.

13. The machine of claim 11, wherein said second means further includes a vibratory feeder bowl having a plurality of casings therein, an in-line feeder, and a dead nest for supplying a single, properly oriented casing to said end effector.

14. The machine of claim 11, wherein said second means further includes an overload assembly mounted in said pick-and-place assembly for alerting an operator of the machine when said end effector attempts to place the casing over the magnet and core portion when another casing is already there.

15. The machine of claim 1, wherein said removing means includes a pick-and-place assembly having an end effector thereon.

16. The machine of claim 15, wherein said end effector includes a punch.

17. The machine of claim 15, wherein said removing means mounts the magnetic latch assembly to a crash stop.

18. The machine of claim 17, further comprising a ram that engages a plunger assembly of said removing means, said ram providing a force for press-fitting the magnetic latch assembly to the crash stop.

19. The machine of claim 17, further comprising means for securing the crash stop during mounting of a magnetic latch assembly to the crash stop by said removing means, said crash stop securing means being mounted to said machine.

20. The machine of claim 19, wherein said crash stop securing means includes a base having a generally flat portion, a generally upright portion, and a biased clamp pin extending through said generally flat portion for mounting the crash stop to the base.

21. The machine of claim 17, wherein said removing means further includes an overload assembly mounted in said pick-and-place assembly for alerting an operator of the machine when said end effector attempts to mount the magnetic latch assembly to the crash stop when another magnetic latch assembly is already there.

22. The machine of claim 1, wherein said machine has multiple stations for progressively assembling the magnetic latch assembly, said stations including a post placement station, a magnet placement station, a casing placement station, and a removal station.

23. The machine of claim 22, further comprising a first indexing turntable on which a portion of said post placing and securing means is mounted, said first indexing turntable advancing components of the magnetic latch assembly to said stations of said machine.

24. The machine of claim 23, wherein there are a plurality of post placing and securing means mounted on said first indexing turntable at said stations of said machine so that a plurality of magnetic latch assemblies can be simultaneously assembled by said machine.

25. The machine of claim 23, further comprising a crash stop assembly station for mounting the magnetic latch assembly to a crash stop.

26. The machine of claim 25, wherein said crash stop assembly station includes a second indexing turntable and means for securing the crash stop mounted thereon.

27. The machine of claim 26, further comprising a crash stop removal station for removing the crash stop and mounted magnetic latch assembly from said crash stop securing means, said second indexing turntable advancing the crash stop and mounted magnetic latch assembly from said crash stop assembly station to said crash stop removal station.

28. The machine of claim 27, wherein said crash stop removal station includes a hand-and-gripper assembly.

29. The machine of claim 27, further comprising a crash stop placement station for placing the crash stop on said crash stop securing means, said second indexing turntable advancing the crash stop from said crash stop placement station to said crash stop assembly station.

30. The machine of claim 29, wherein said crash stop placement station includes an actuator mechanism for placing a crash stop on said crash stop securing means, a vibratory feeder bowl having a plurality of crash stops therein, an in-line feeder, and a dead nest for supplying a single properly oriented crash stop to said actuator mechanism.

31. The machine of claim 23, wherein said machine includes a magnetization station having means for magnetizing the magnet subsequent to placement of the casing thereover.

32. The machine of claim 31, wherein said machine includes a magnetization verification station having means for verifying that magnetic field strength of the magnetized magnet of the magnetic latch assembly is within a predetermined range of values, said verifying means alerting an operator of the machine if the magnetic field strength of the magnetized magnet is outside of the predetermined range.

33. The machine of claim 32, wherein said verifying means includes a Hall effect sensor.

34. The machine of claim 23, wherein said machine includes a vacuum station having means for removing particulate matter from the magnetic latch assembly subsequent to placement of the casing over the magnet and core.

35. A machine for assembling a magnetic latch assembly having components that include a post, a magnet, and a casing, comprising:
a gripper assembly for securing the post in a preferred orientation during assembly of the magnetic latch assembly, the gripper assembly including
a fixed jaw having a notch formed therein;
a movable jaw, a surface of which adjacent said fixed jaw tapers to define, in cooperation with the notch, an opening to receive a pin portion of the post,
means for biasing said movable jaw, and
means for mounting said fixed and movable jaws and said biasing means to the machine;
first means for assembling the magnet adjacent a core portion of the post; and
second means for assembling the casing over the magnet and the core portion.

36. The machine of claim 35, wherein said movable jaw has a substantially flat surface formed thereon that is engaged by an actuator of said machine which displaces said movable jaw in a direction against the bias of said biasing means so that the pin portion is insertable between said jaws.

37. The machine of claim 35, wherein said fixed and movable jaws are formed from 300 series stainless steel that is coated with titanium nitride.

38. The machine of claim 35, wherein adjacent surfaces of said jaws include wear-resistant inserts.

39. The machine of claim 38, wherein said wear-resistant inserts are made from carbide material.

40. The machine of claim 35, wherein said biasing means comprises a spring disposed in a groove formed in said movable jaw.

41. The machine of claim 35, wherein said mounting means includes a two-piece housing.

42. A machine for assembling a magnetic latch assembly, the magnetic latch assembly having components that include a post, a magnet, and a casing, the machine comprising:
first means for assembling the magnet adjacent a core portion of the post;
second means for assembling the casing over the magnet and the core portion;
means for attaching the assembled magnetic latch assembly to a crash stop; and
means for securing the crash stop during attaching of the assembled magnetic latch assembly to the crash stop by said attaching means, the securing means being fixed to said machine and including
a base having a generally flat portion and a generally upright portion,
means for mounting the crash stop to the base,
means attached to said base for supporting a heel portion of the crash stop, and
means formed in said upright portion of said base for facilitating alignment of the crash stop on said base prior to attachment of the assembled magnetic latch assembly to the crash stop.

43. The machine of claim 42, wherein said mounting means includes a clamp pin mounted in said generally flat portion of said base so as to extend substantially orthogonally therefrom and through an opening formed in the crash stop and means for biasing said clamp pin so that, when said clamp is moved against the direction of bias thereon, it exerts a force on the crash stop that secures the crash stop to said base.

44. The machine of claim 43, wherein said biasing means includes an O-ring that is disposed in said base so as to surround a peripheral portion of said clamp pin.

45. The machine of claim 42, wherein said alignment facilitating means includes a groove formed in said upright portion of said base.

46. The machine of claim 42, wherein said supporting means includes a locator pin mounted in said generally upright portion of said base, said locator pin having a substantially flat top surface that extends above said flat portion and abuts against a heel portion of the crash stop.

47. The machine of claim 42, wherein portions of said base are recessed so as to provide clearance for an end effector used to place the crash stop onto and remove the crash stop and attached magnetic latch assembly from said crash stop securing means.

* * * * *